March 17, 1964 J. B. BUTLER 3,124,881
WHEEL ALIGNMENT TESTING APPARATUS
Filed July 26, 1960
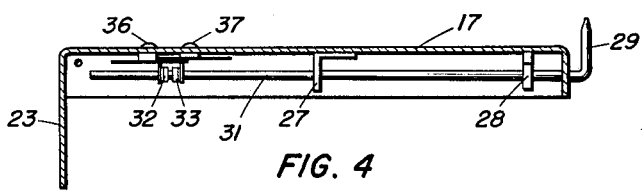
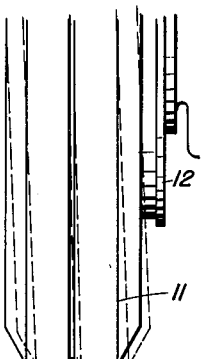
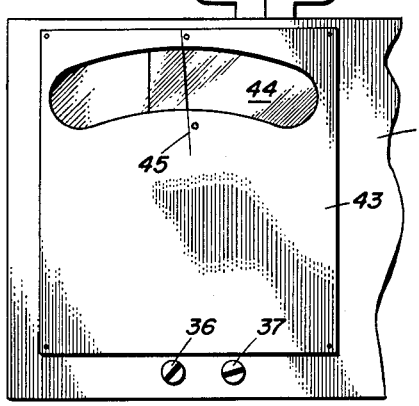
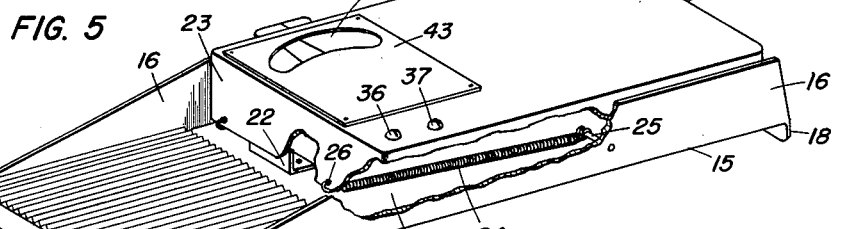
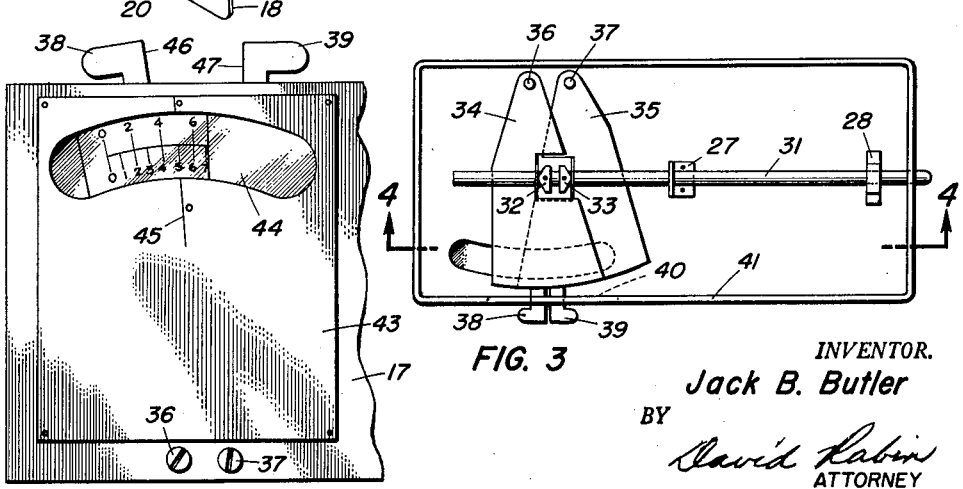
INVENTOR.
Jack B. Butler
BY
ATTORNEY

United States Patent Office 3,124,881
Patented Mar. 17, 1964

3,124,881
WHEEL ALIGNMENT TESTING APPARATUS
Jack B. Butler, 209 Hermitage Road, Greensboro, N.C.
Filed July 26, 1960, Ser. No. 45,398
8 Claims. (Cl. 33—169)

The present invention relates to wheel alignment instruments for motor vehicles and relates more particularly to a wheel testing apparatus for determining the extent of wear in the front wheel assembly and in the steering linkage of a motor vehicle.

Presently some states have enacted motor vehicle safety statutes requiring periodic inspection of vehicles and one inspection feature for determining mechanical defects is the amount of play in the front wheels of the vehicle resulting from wear of the king pins as well as other linkages in the steering mechanism that produce faulty steering and control of the front wheel assembly. Other states have a voluntary inspection system in which motor vehicles are checked through inspection stations for those mechanical defects which, from experience, have contributed to accidents. One major factor listed in these inspections is a determination of the extent of front wheel play and misalignment.

Therefore, it is an objective of this invention to provide a wheel alignment testing instrument that will determine the extent of front wheel play and wear from a central position along the road-engaging surface of a tire.

Another object of this invention is the provision of a front wheel testing apparatus for visually indicating the extent of front wheel free play in lateral directions from a predetermined position along the road-engaging surface of a tire.

Still another object of this invention is to provide a portable wheel alignment testing apparatus which may be readily introduced under the front wheel of a motor vehicle by elevating each wheel individually of the front end of a motor vehicle a short distance from the ground and determine the lateral free play and visually indicate the displacement of the wheel on an indicating gauge.

Yet another object of this invention is to provide a low cost accurate wheel testing device for determining the amount of free play in the wheel by measuring the free displacement of the wheel from a predetermined position along the ground-engaging surface of the tire.

Other objectives and many of the attendant advantages of this invention will become more readily apparent to those familiar with this art from the following detailed description taken in conjunction with the accompanying drawings, in which like character of reference correspond to similar elements of the testing apparatus, and in which:

FIG. 1 is an end elevational view of the wheel testing apparatus of the present invention positioned beneath a tire mounted on a wheel of a vehicle for determining the deflection thereof;

FIG. 2 is a perspective view of a wheel testing apparatus of the present invention with portions of the platform removed to present portions of the interior structure beneath the pivotable platform;

FIG. 3 is a bottom plan view, somewhat reduced in size, of the indicating mechanism mounted beneath the apparatus platform;

FIG. 4 is a transverse sectional view taken substantially along the plane of section line 4—4 of FIG. 3;

FIG. 5 is an enlarged plan view of the reference scale on the apparatus platform prior to performing a test to determine deflection of a wheel; and FIG. 6 is a view substantially similar to FIG. 5 presenting the reference scale upon completion of a test to determine the deflection of the tire and wheel.

Referring to the drawing and more particularly to FIG. 1 there is illustrated the tire deflection testing apparatus 10 of this invention mounted beneath an elevated front tire 11 that is supported on wheel 12 of a motor vehicle for determining the extent of tire deflection with the slidable tire-engaging caliper 13 contacting the center line of the road-engaging periphery 14 of the tire. The apparatus 10 is provided with a U-shaped base plate 15 having upturned flanges 16 that are laterally spaced apart to accommodate a pivotable platform 17 therebetween. The base plate is also provided with downturned front and rear flanges 18 for elevating the base 19 above the ground. The base 19 is provided with a front corrugated mat 20 to facilitate positioning the testing apparatus under an elevated tire and maintaining it in position during a test by the operator placing his foot thereon to prevent lateral shifting of the apparatus.

The platform 17 is pivotably mounted on the upturned flanges 16 through the rod 21 retained in the front ends of the flanges and the extent of counterclockwise rotation of the platform is limited by the positioning of the angle iron 22 secured to the base 19 with the vertical projecting legs thereof communicating with the forward edge 23 of the platform. A helical spring 24 engages the stud 25 secured to one of the upturned flanges 16 with the other end of the spring engaging the forward edge 23 of the platform through the opening 26 therein. Spring 24 yieldably urges the platform 17 against the tire, or against stop 22 in the event that no wheel is in position to be tested.

The L-shaped tire-engaging caliper 13 is slidably mounted in the guide brackets 27 and 28 supported beneath the platform 17 in spaced relation with the projecting end of the caliper having the short leg 29 provided with a pointer 30 for engaging the periphery of a tire. The long leg of the caliper extends longitudinally under the platform in the guide brackets 27 and 28. A pair of indexing lugs 32 and 33 are adjustably mounted on the caliper leg 31 for engaging the pivotally mounted indexing markers or standards 34 and 35 each of which is pivotally supported on the platform through the studs 36 and 37 respectively. Each of the standards 34 and 35 is provided with a projecting lug member 38 and 39 respectively, which lug members extend through a slotted opening 40 in the side wall 41 of the platform 17.

The platform 17 is provided with an opening 42 over which there is mounted a plate 43 having a window 44 therein that is suitably calibrated in increments designed to indicate the deflection of the tire from a reference position 45.

As will appear more readily in FIG. 5, the window 44 need not be calibrated except to indiacte the reference position from which the lug members 38 and 39 are initially registered on the center line position when the pointer 30 engages the center position of a tire to be tested. As the tire in FIG. 1 is deflected to the left, the lug 32 will engage the standard 34 as the caliper is displaced to the left thereby pivoting the standard 34 which will have the graduations marked thereon and will appear through the window 44 as a displacement to the left of the reference position 45 indicated with the zero mark. This will indicate the extent of deflection from the center line position of the tire in one direction. With the pointer still engaging the tire, the tire is deflected to the right thereby displacing the caliper 13 to the right with the lug 33 engaging the standard 35 revealing the extent of deflection from the reference position 45 as revealed from the graduations marked on the upper face of the standard 35 through the window 44 in the platform. This deflection to the right is recorded as a displacement from the reference position 45. The total deflection from the zero position may be determined either from the scale markings presented through the window 44 or by measuring the distance between the faces 46 and 47 on the lug members 38 and 39. This visual indication will present to the motor vehicle operator and the inspector an immediate indication of the extent of free deflection in the wheel being tested to determine whether the deflection comes within the prescribed safety standards.

It will be readily appreciated that various modifications may be made in the standards and in the marking indicia whether it be on the window 44 or on the actual standards for determining the extent of deflection in the tire thereby presenting a testing device having a visual indication of the tire deflection eliminating the human error and guesswork of determining tire deflection.

Obviously many modifications and variations may be made to the tire-engaging caliper, the positioning and type of standards employed within the spirit of this invention and modifications thereof are contemplated without departing from the invention and the appended claims.

What is claimed is:

1. A wheel alignment testing apparatus comprising a base plate, a platform pivotally mounted on said base plate, means for yieldably biasing said platform to an elevated position, said platform having a tire caliper slidably mounted thereon and projecting from the platform to communicate with a ground-engaging surface of a tire, a pair of tire-displacement indicating standards pivotally mounted on said platform, means on the slidable caliper for pivoting said standards in response to tire movement, and a calibrated scale on the platform for indicating displacement of the standards from a reference position.

2. A wheel alignment testing apparatus comprising a base plate, a platform pivotally mounted on said base plate, means for yieldably biasing said platform to an elevated position, said platform having a tire caliper slidably mounted thereon and projecting from the platform to communicate with a ground-engaging surface of a tire, a tire-displacement indicating standard pivotally mounted on said platform, means on the slidable caliper for pivoting said standard in response to tire movement, and a calibrated scale on the platform in juxtaposition with said standard for indicating displacement of said standard from a reference position.

3. A wheel alignment testing apparatus comprising a base plate, a platform pivotally mounted on said base plate, means for yieldably biasing said platform to an elevated position, said platform having a L-shaped tire caliper slidably mounted thereon, one leg of said L-shaped caliper being slidably retained on the platform and the other leg of said L-shaped caliper projecting upwardly to communicate with a ground-engaging surface of a tire, a pair of tire-displacement indicating standards pivotally mounted on said platform, means on the slidable caliper for pivoting said standards in response to tire movement, and a calibrating scale on the platform for indicating displacement of the standards from a reference position.

4. A tire alignment testing apparatus comprising a base plate, a platform mounted on said base plate, said platform having an L-shaped tire caliper projecting from and displaceably mounted thereon to communicate with a ground-engaging surface of a tire, a tire-displacement indicating standard on said platform, means on the caliper for displacing said standard in response to tire movement in a single direction, and a calibrated scale for indicating displacement of the standard from a reference position.

5. A wheel alignment testing apparatus comprising a base plate, a platform pivotally mounted on said base plate, means for yieldably biasing said platform to an elevated position, said platform having an L-shaped tire caliper, one leg of said L-shaped caliper being slidably supported on the platform and the other leg of said L-shaped caliper projecting upwardly from the platform to communicate with the ground-engaging surface of a tire, a tire displacement indicating standard pivotally mounted on said platform, means on the slidable caliper for pivoting said standard in response to tire movement, and means for indicating the displacement of the standard from a reference position.

6. A wheel alignment testing apparatus comprising a base, a platform pivotally mounted on said base, a tire engaging caliper mounted on said platform, means for yieldably urging said platform to an elevated position for engagement of the tire caliper with the ground-engaging surface of a tire, a pair of tire-displacement indicating standards pivotally mounted on said platform, means on the caliper for pivoting said standards in response to tire movement, and a calibrated scale on the platform for indicating displacement of the standards from a reference position.

7. A wheel alignment testing apparatus comprising a base, a platform pivotally mounted on said base, an L-shaped tire caliper slidably mounted on said platform with one leg of said L-shaped caliper extending upwardly to engage the ground-engaging surface of a tire, means for yieldably biasing the platform to an elevated position, a pair of tire-displacement indicating standards, means on said caliper for displacing said standards in opposite directions, and a calibrated scale on the platform for indicating displacement of the standards from a reference position.

8. A tire alignment testing apparatus comprising a base plate, a platform pivotally mounted on said base plate, said platform having a tire caliper slidably mounted thereon and projecting from the platform to communicate with a ground-engaging surface of a tire, a tire-displacement indicating standard mounted on said platform, and means on the slidable caliper for actuating said standard in response to tire movement.

References Cited in the file of this patent

UNITED STATES PATENTS

| | | |
|---|---|---|
| 667,836 | Wood | Feb. 12, 1901 |
| 2,281,197 | Martin | Apr. 28, 1942 |
| 2,508,849 | Williams | May 23, 1950 |